United States Patent [19]
Nishihara

[11] Patent Number: 5,897,447
[45] Date of Patent: Apr. 27, 1999

[54] FRP RACKET AND METHOD FOR PRODUCING THE SAME

[75] Inventor: Masahiro Nishihara, Ehime, Japan

[73] Assignee: Toray Industries, Inc., Tokyo, Japan

[21] Appl. No.: 08/973,171

[22] PCT Filed: Apr. 2, 1997

[86] PCT No.: PCT/JP97/01143

§ 371 Date: Feb. 2, 1998

§ 102(e) Date: Feb. 2, 1998

[87] PCT Pub. No.: WO97/36653

PCT Pub. Date: Oct. 9, 1997

[30] Foreign Application Priority Data

Apr. 2, 1996 [JP] Japan .................................. 8-104566

[51] Int. Cl.⁶ .................................................. A63B 49/10
[52] U.S. Cl. .................................................. 473/535
[58] Field of Search .................................. 473/547, 535, 473/536, 319

[56] References Cited

U.S. PATENT DOCUMENTS

| | | | |
|---|---|---|---|
| 4,725,060 | 2/1988 | Iwanaga | 473/319 X |
| 4,840,826 | 6/1989 | Shirasaki et al. | 428/36.91 |
| 5,143,374 | 9/1992 | Shibasaki | 473/319 |
| 5,242,721 | 9/1993 | Oonuki et al. | 473/319 X |
| 5,396,932 | 3/1995 | Homma et al. | 139/420 A |
| 5,419,554 | 5/1995 | Krone et al. | 473/535 |
| 5,487,806 | 1/1996 | Viellard | 473/535 X |
| 5,507,486 | 4/1996 | Miyamoto | 473/535 |
| 5,540,877 | 7/1996 | Repetto et al. | . |
| 5,575,875 | 11/1996 | Brittingham et al. | 473/536 X |

FOREIGN PATENT DOCUMENTS

| | | |
|---|---|---|
| 05 47330 A2 | 6/1993 | European Pat. Off. . |
| 07 00775 A1 | 3/1996 | European Pat. Off. . |
| 54-118270 | 2/1953 | Japan . |
| 54-76672 | 6/1979 | Japan . |
| 1-185272 | 7/1989 | Japan . |
| 6-286005 | 10/1994 | Japan . |

*Primary Examiner*—Raleigh W. Chiu
*Attorney, Agent, or Firm*—Birch, Stewart, Kolasch & Birch, LLP

[57] ABSTRACT

A FRP racket having a frame includes fibre reinforced plastic containing resin and reinforcing fibre and which is composed of a top portion which forms the string face, a grip region and a throat portion. This frame contains at least one helically wound layer of continuous reinforcing fibre yarn and, furthermore, the winding angle of the continuous reinforcing fibre yarn in terms of the frame axial direction is varied in the axial direction in at least one such helically wound layer.

8 Claims, 6 Drawing Sheets

FRP RACKET AND METHOD FOR PRODUCING THE SAME

This application claims the benefit under 35 U.S.C. §371 of prior PCT International Application No. PCT/EP96/02357 which has an International filing date of May 31, 1996 which designated the United States of America, the entire contents of which are hereby incorporated by reference.

TECHNICAL FIELD

The present invention relates to a fibre reinforced plastic (hereinafter referred to as FRP) racket and its method of manufacture and, in particular, it relates to the optimum structure of the racket frame.

PRIOR ART

FRP tubes are lightweight and have high strength characteristics and so are employed in various fields such as sports and leisure applications like golf shafts and fishing rods, etc. Furthermore, FRP curved tubes are widely used as racket frames. A general method of manufacturing such a racket frame is to cut, to a prescribed width, carbon or glass reinforcing fibre woven fabric prepreg, unidirectional prepreg or angle plied prepreg in which such unidirectional prepreg is superimposed in a crosswise fashion. The prepreg is then laid-up one by one to form a laminate onto a core material, after which the preform thus obtained is introduced into a mold that is heated. Another general method is where the racket frame is molded by so-called internal pressure molding in which laying-up is performed by wrapping the prepreg one ply at a time around a mandrel covered by a flexible tube, after which the mandrel is then withdrawn. The preform obtained is then introduced into a mold and, while heating the mold, pressure is applied by means of a pressurized fluid (eg compressed air) within the flexible tube. Below, methods of molding a racket frame using a prepreg are referred to as the 'prepreg method'.

Moreover, as a method for manufacturing the preform, there is also known the method in which the preform is produced by winding a reinforcing fibre bundle around a core material by a filament winding method (hereinafter referred to as the FW method), the preform then being set in the mold and the molding of the desired racket frame is made. Again, there is known method where winding is performed by the FW method around a core material covered with a flexible tube, after which the core material is withdrawn. The preform obtained is introduced into a mold along with the flexible tube, and the racket frame is molded by internal pressure molding.

A racket frame based on this FW method has the setting of the reinforcing fibre winding angle is easy and provides an increase in design flexibility which improves frame performance. Moreover, in the preparation of the preform by the prepreg method, there are numerous stages, namely prepreg preparation/ cutting/laying-up, in addition to many manual operations, in the FW method, the preform is prepared in a single stage comprising a winding with a dedicated machine, so from the point of view of manufacture the FW method also possesses the features of reducing working time and increasing produce stabilization.

As a method of manufacturing rackets by the FW method, there is also known a method in which the reinforcing fibre bundle is wound by the FW method in a dry state without applying resin onto a core material covered with a flexible tube, after which the core material is withdrawn and the preform obtained is introduced into the mold along with the flexible tube. While pressurizing the interior tube, molding is effected by injecting a low viscosity thermosetting resin and performing crosslinking (this is referred to as the RTM [resin transfer molding method] discussed below), as described in Japanese Unexamined Patent Publication No. 6-286005, U.S. Pat. No. 5,540,877 and International Unexamined Publication WO95/25633. Further, there is known a molding method in which, using the same kind of preform, a thermoplastic resin is injected and a polymerization reaction effected (RIM [reaction injection molding]) as described in EP-A-547330.

Figure 4:
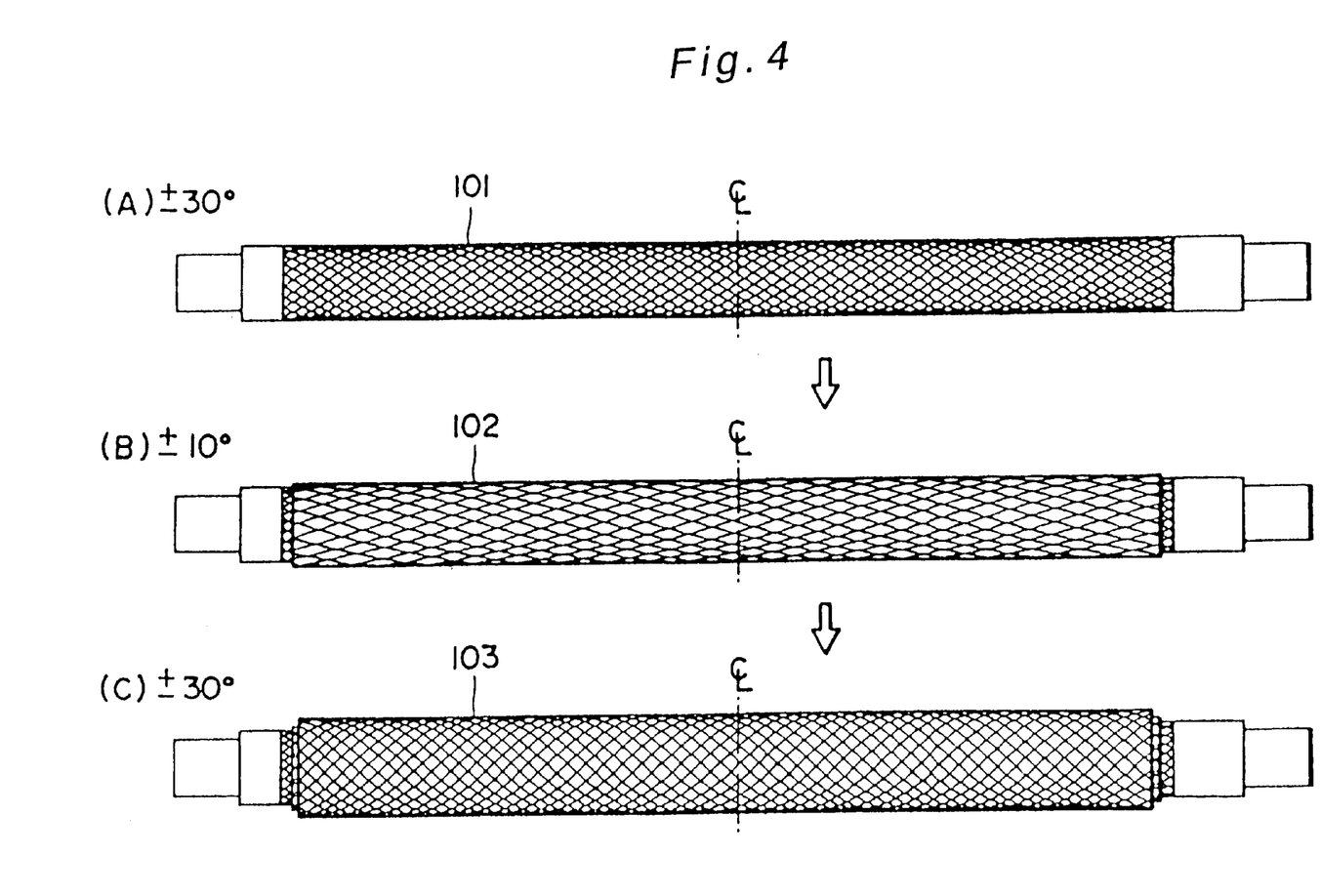
FIG. 4 are side views for explaining the winding angle of the continuous reinforcing fiber in the preform for the frame of a conventional racket.

The winding of the reinforcing fibre in preform production based on the FW method is normally carried out as shown in, for example, FIG. 4, where one helical layer is formed by winding at a certain constant angle across the entire tube length, and then on top there are formed a prescribed number of superimposed wound layers by winding at other constant winding angles, as required. In the example shown in FIG. 4, (A) helically wound layer 101 is formed by winding the reinforcing fibre at a winding angle of ±30° in terms of the tube axial direction, then (B) a helically wound layer 102 is formed on top by winding at a winding angle of ±10° in terms of the tube axial direction, and then again helically wound layer 103 is formed on top of this by winding at a winding angle of ±30°. A racket molded using such a preform has substantially the same strength properties over the entire frame length.

However, depending on the particular racket, different properties may be required according to the position in the frame axial direction. If, for example, high strength properties are demanded in a part of the frame in the method in FIG. 4, then it is necessary to increase the amount of reinforcing fibre at this position. Hence, the problem arises that the frame as a whole has to be made to meet the characteristics required at this particular position, so that the amount of reinforcing fibre in the frame as a whole is increased to more than is required which in turn, increases the weight of the frame, so the design flexibility is markedly restricted.

DISCLOSURE OF THE INVENTION

In view of problems of the kind described above, an objective of the present invention lies in offering a FRP racket with outstanding physical properties without impairing its lightness or reduced weight. Another objective lies in offering a method of manufacturing a FRP racket in which there is great design flexibility, and which is outstanding in its operational efficiency and where the physical properties of the product are stable.

One aspect of the FRP racket relating to the present invention is a FRP racket having a frame comprising a fibre reinforced plastic containing resin and reinforcing fiber, which is composed of a top portion forming the string face, a grip portion and a throat portion connecting the top portion and grip portion. This frame contains at least one helically wound layer of continuous reinforcing fibre yarn and, furthermore, the winding angle of the continuous reinforcing fibre yarn in terms of axial direction of the frame in at least one of the helically wound layers is varied in the axial direction thereof.

In this way, it is possible to satisfy the required properties which are desired at each position on the racket without loss of the rackets lightness.

In one aspect of the method of manufacturing a FRP racket relating to the present invention, after forming around a flexible tube a resin-free reinforcing fibre cylinder containing at least one helically wound layer of continuous reinforcing fibre yarn in which the winding angle in respect of the axial direction of this flexible tube is varied in the axial direction thereof, this cylinder is introduced along with the flexible tube into a mold with a racket-shaped cavity. While pressurizing the flexible tube interior, resin is injected into the cavity and molding is effected.

In another aspect of the method of producing a FRP racket relating to the present invention, after forming around a flexible tube a resin-impregnated reinforcing fiber cylinder containing at least one helically wound layer of continuous reinforcing fiber yarn in which the winding angle in respect of the axial direction of this flexible tube is varied in the axial direction thereof, this cylinder is introduced along with the flexible tube into a mold with a racket frame shaped cavity where molding is effected while pressurizing the flexible tube interior.

In still another aspect of the method of producing a FRP racket relating to the present invention, after forming around a core a resin-free reinforcing fibre cylinder, containing at least one helically wound layer of continuous reinforcing fibre yarn in which the winding angle in respect of the axial direction of this core is varied in the axial direction thereof, this cylinder is introduced along with the core into a mold with a racket frame shaped cavity, then resin is injected and molding is effected.

In yet a further aspect of the method of producing a FRP racket relating to the present invention, after forming around a core a reinforcing fibre resin-impregnated cylinder, containing at least one helically wound layer of continuous reinforcing fibre yarn in which the winding angle in respect of the axial direction of this core is varied in the axial direction thereof, this cylinder is introduced along with the core into a mold with a racket frame shaped cavity, and molding is effected.

In accordance with the method of manufacturing a FRP racket relating to the present invention, it is possible to produce the FRP racket with extremely high design flexibility and with stable physical properties. Further, by producing the preform by the FW method, as well as markedly simplifying the preparation/cutting/ laying-up process based on the prepreg method, it is possible to achieve product stabilization. Moreover, by the RTM method employing low viscosity resin injection, there is realised a cheap production method in which it is possible to obtain mouldings with few voids and where a simplification of after-processes such as polishing/putty filling, etc, may be achieved. Further-more, in the RTM method, since neat resin is used in a closed cycle, the workplace can be kept clean.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein.

OPTIMUM CONFIGURATIONS FOR PRACTICING THE INVENTION

Below, explanation is given, with reference to the drawings, of favourable practical configurations of the invention.

Figure 1:
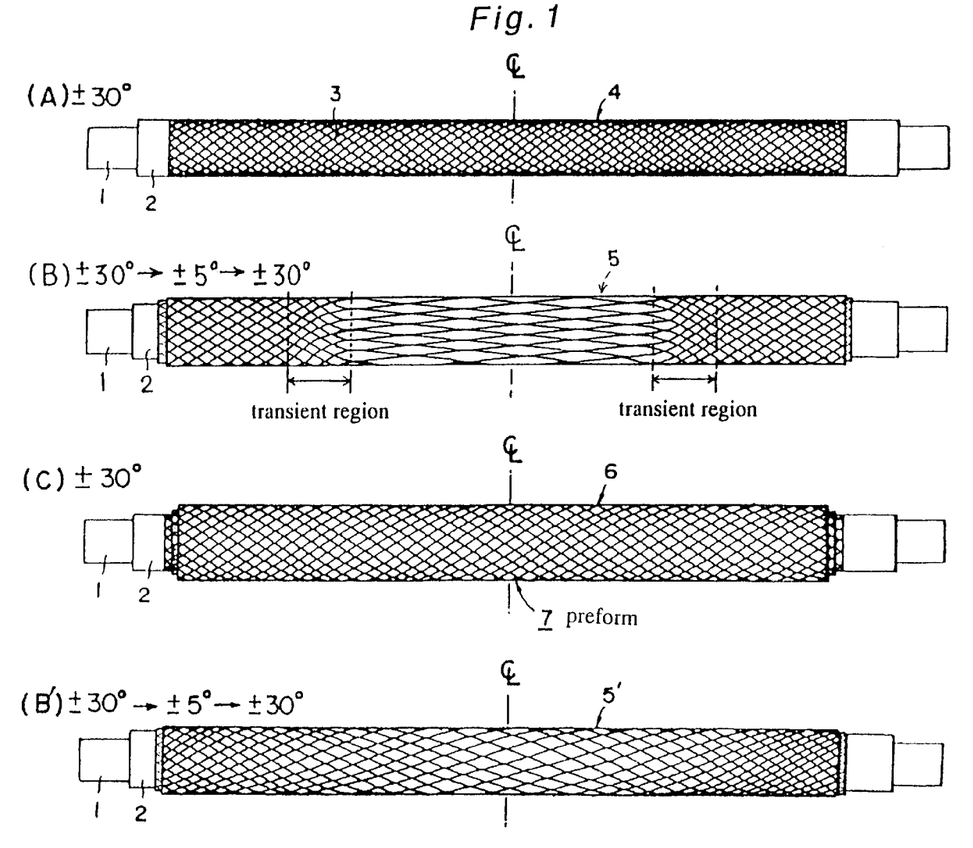
FIG. 1 shows side views for explaining the winding angle of the continuous reinforcing fibre yarn in the preform for the frame of a racket relating to an example of the present invention.
Figure 2:
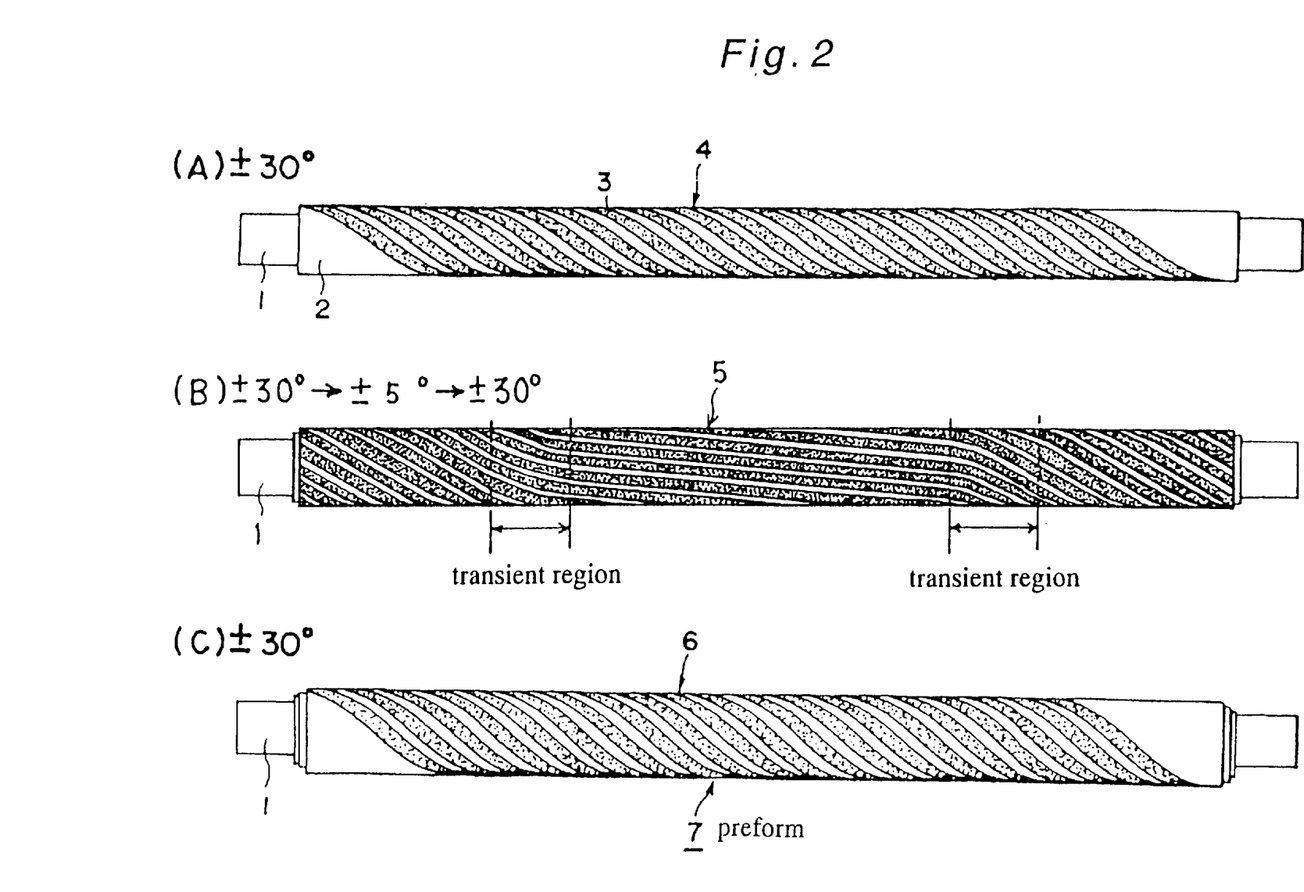
FIG. 2 shows side views for explaining the winding angle of the continuous reinforcing fibre yarn in the preform for the frame of a racket relating to an example of the present invention, and it is an example in which a flat strand is used.
Figure 3:
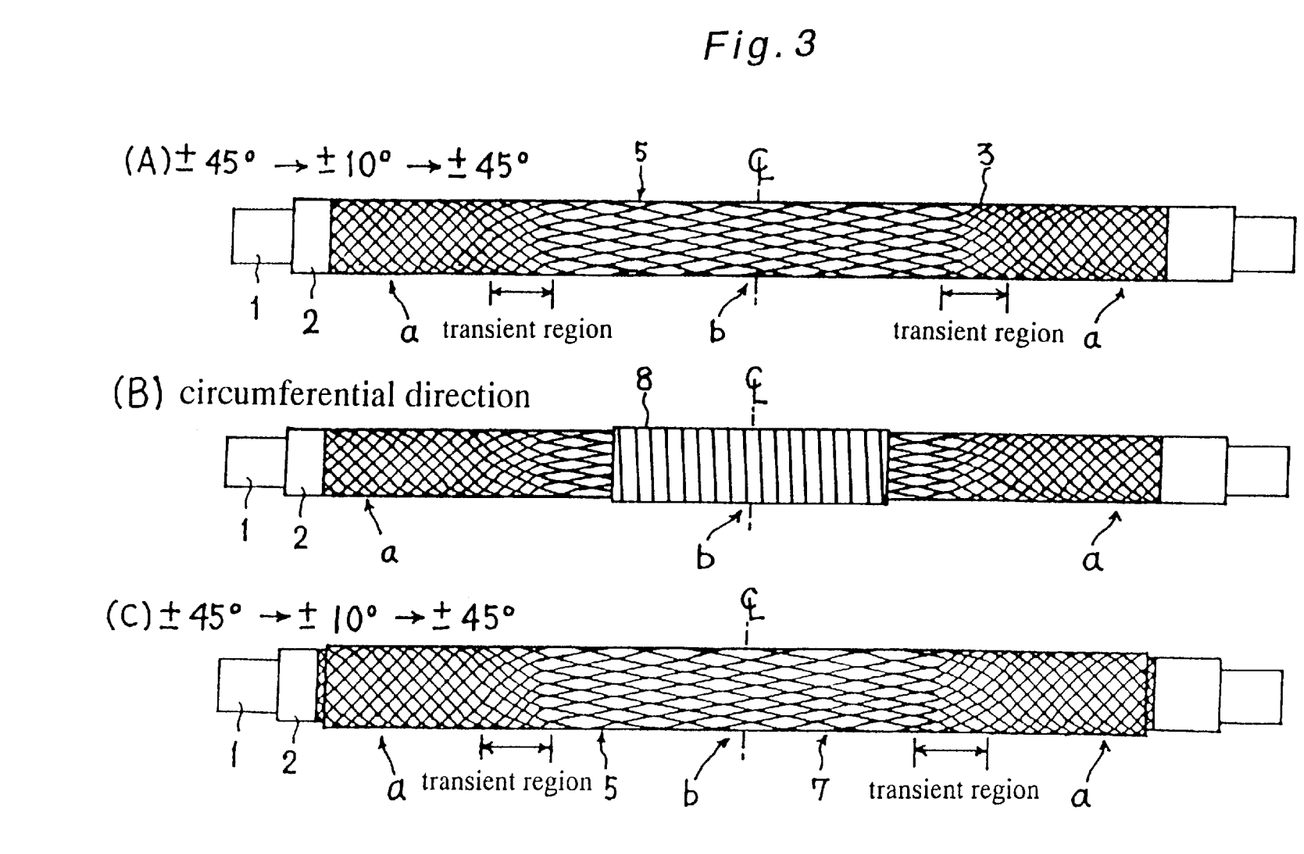
FIG. 3 shows side views for explaining the winding angle of the continuous reinforcing fibre yarn in the preform for the frame of a racket relating to an example of the present invention, and it is an example in which a circumferential direction winding is arranged in the region corresponding to the racket top portion.
Figure 5:
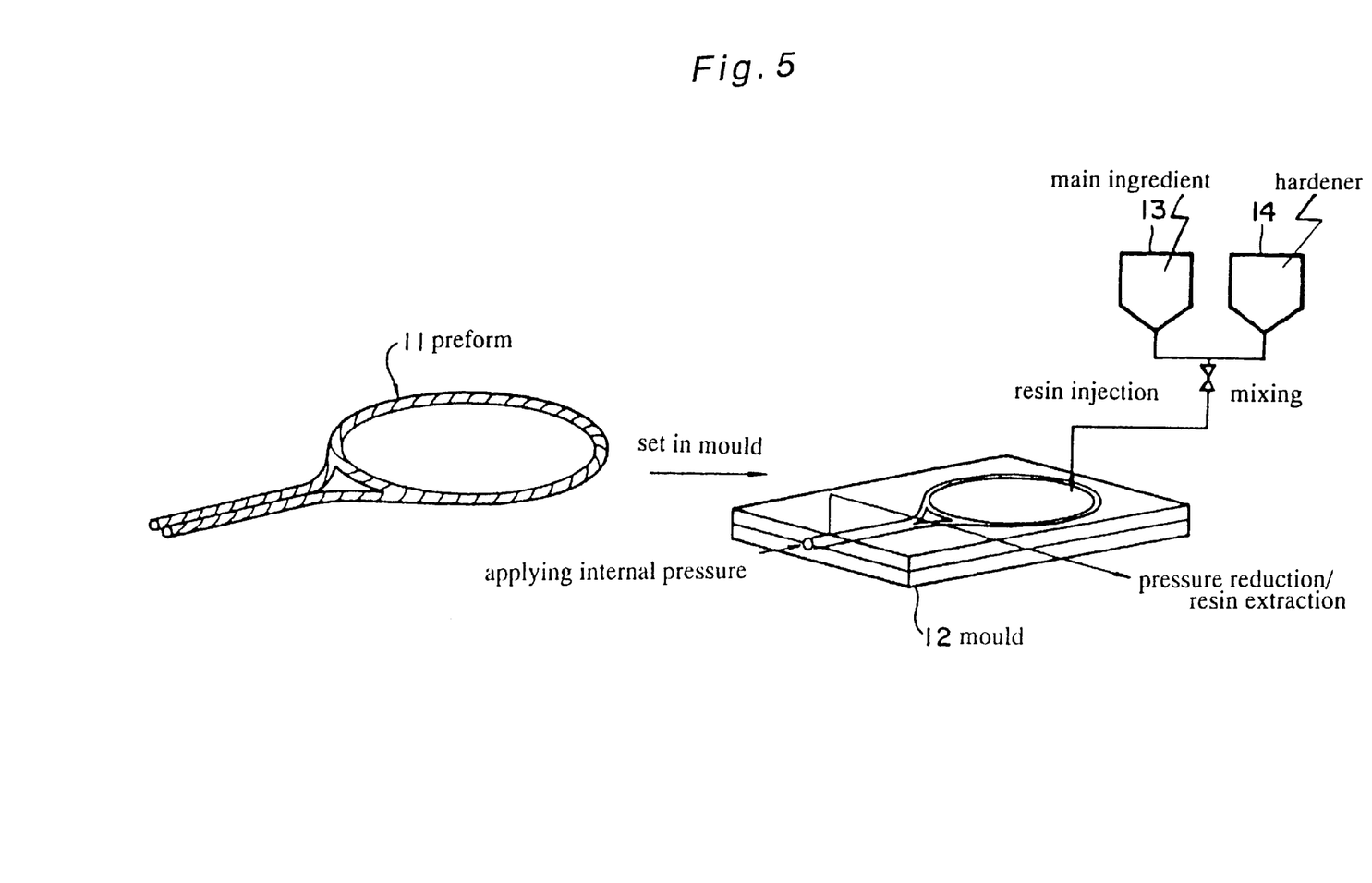
FIG. 5 is a schematic manufacturing process diagram showing the method of the present invention in which the resin-free dry preform is held within a mold along with the flexible tube and, while pressurizing said tube interior, the racket frame is molded by the RTM method.
Figure 6:
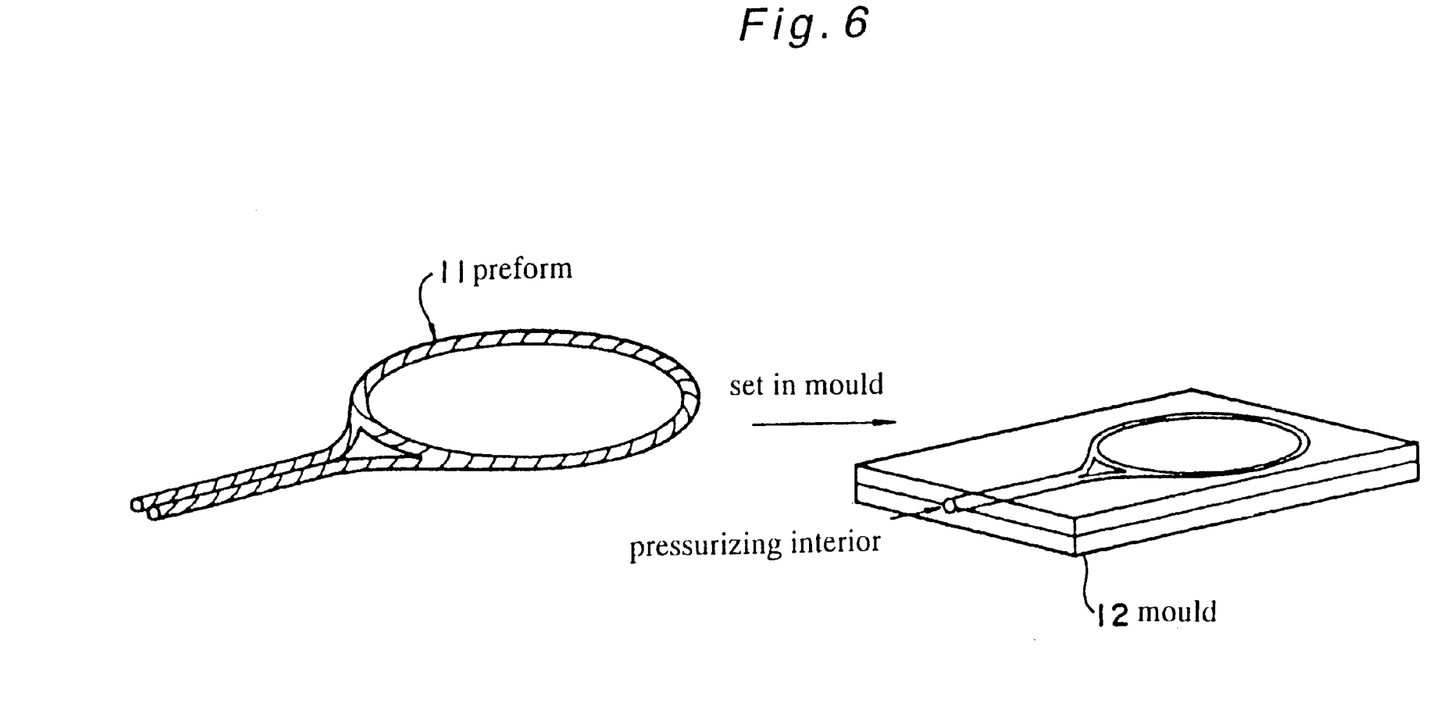
FIG. 6 is a schematic manufacturing process diagram showing the method of the present invention in which the resin-impregnated preform is held within a mold along with the flexible tube and, while pressurizing said tube interior, the racket frame is heated and molded.

FIG. 1, FIG. 2 and FIG. 3 respectively show examples illustrating the winding angles of the continuous reinforcing fibre yarn in the preform used for the frame of the FRP racket relating to the present invention FIG. 5 and FIG. 6 show methods of manufacturing the racket frame by introducing the preform into a mold.

In FIG. 1, as shown in FIG. 1(A), on flexible tube core material 2 which covers mandrel 1 there is a layer formed by the helical winding of reinforcing fibre 3 by the FW method. In this helically wound layer 4, the winding angle of the reinforcing fibre 3 in terms of the axial direction of the preform (the axial direction of mandrel 1 or core material 2) in this embodiment is ±30°, and this is kept constant across the entire axial direction length.

Next, on this helically wound layer 4, as shown in FIG. 1(B), there is formed reinforcing fibre helically wound layer 5 by commencing the winding with the winding angle firstly at 30° relative to the axial direction, and just before the region corresponding to the frame top portion altering the winding angle from 30° to 5°, then continuing the winding while keeping at 5° in the region corresponding to the top portion, after which from the point where the top portion ends this angle is changed from 5° to 30°, and the winding then continued is still kept at 30° up to the end region of the core material. In regard to the angle transient region, it will be sufficient if this extends about 10 cm. Now, it is preferred that the change in the winding angle does not occur suddenly but takes place continuously, and it is further preferred that the change occurs continuously and smoothly. Where the winding angle is suddenly changed, as well as there being an abrupt alteration in physical properties in this region, the yarn will also readily become disrupted in this region during the handling of the molding, so the stability of the racket properties is impaired.

Again, as shown in FIG. 1(B'), the helical layer in which the winding angle changes may be one where there is change between the frame top portion and the grip end portions. In the formation of this helically wound layer 5 in the FW method the winding angle is changed at an arbitrary position during the single two-way traverse. The winding angle in FIG. 1(B') changes from ±30° at the core material end regions to ±5° in the axial centre region (around the centre line in the figure), and as it approaches the tube end on the other side it again changes to ±30°. This change in winding angle can be freely set in the FW method.

Further, on this helically wound layer 5, there is provided a helically wound layer 6 of reinforcing fibre as shown in FIG. 1(C). In this embodiment, the helically wound layer 6 constitutes the outermost layer and the winding angle is set to be constant at ±30° C. By having a constant winding angle in the outermost layer, it is possible to further stabilize the configuration of the preform. In this way, preform 7 is produced.

The winding angle in this helically wound layer can be freely varied within the range from ±1° to 75° in respect of the axial direction of the frame, excepting at the grip end portions of the frame. Now, the grip end portions of the frame are the turning regions of the reinforcing fibre bundle at the time of FW, so there may instantaneously be a winding angle of 90°, etc. However, the grip end portions of the frame are often separated from the product at the time of the racket frame molding or after the molding.

Furthermore, in regard to the winding angle, if one takes into consideration winding onto about 1 m of the top portion on a core material of diameter 16 mm, then, at an angle of 3° about one lap is possible and at 5° about two laps are possible, and so from the point of view of the stability of the configuration of the wound reinforcing fibre at least 3° is more preferred, while if it is at least 5° then the configuration can be maintained yet more reliably, so this is still further preferred. Again, as an upper limit, bif one considers a laminate structure of unidirectional reinforcing fibre closer to quasi-isotropy, then below 70° is more preferred. Moreover, if one takes into consideration a three-layer structure of 0°,+60°, −60°, which is the simplest quasiisotropic structure, then an angle of less than 60° is further preferred.

Again, one of the important properties of the racket frame is the repulsive force and repulsive force area (one kind of so-called sweet spot), and in order to enhance this it is necessary to raise the stiffness of the frame top portion, and it is preferred that the alignment angle of the reinforcing fibre in this region be made low in terms of the frame axial direction. To meet this objective, the winding angle in the frame top portion is preferably ±1 to 45°, and in other regions (throat and grip portions) it is preferably ±20 to 60°. In the other regions, it is possible to vary the angle somewhat in order to adjust the weight and balance balance without greatly changing the overall properties. Now, the winding angle of the top portion is more preferably at least ±3° in the same way as above, with at least ±5° being further preferred and, from the point of view of stiffness enhancement in the frame axial direction, less than ±40° is more preferred with less than ±30° still further preferred. The winding angle in the throat and grip portions is extremely important for adjusting the weight and balance of the frame as a whole, but taking into consideration the fibre arrangement for a more stable configuration, from ±25 to 50° is more preferred, with from ±30 to 45° being still further preferred.

The helically wound layer of reinforcing fibre in which the winding angle is altered is preferably made a layer other than the outermost layer in the case where the racket frame has a plurality of reinforcing fibre helically wound layers. By making the outermost layer a layer of constant winding angle, it is possible to provide the external face of the product with a uniform surface and achieve a good external appearance, while still varying the mechanical properties at each position to match the required characteristics.

FIG. 2 shows the same kind of embodiment as in FIG. 1 but it is an example of the case where a flat strand has been used. Now, in order to facilitate understanding of the state of the winding angle, only yarn with a winding angle in just one direction is shown. Here, flat strand refers to continuous reinforcing fibre yarn of a form in which the yarn width is considerably greater than the yarn thickness. Further, in the present invention, it is preferred that there be substantially no twist in the flat yarn comprising reinforcing fiber multifilament yarn. Here, "substantially no twist" refers to a state in which there is no more than 1 turn per 1 m of yarn length.

If there is a twist in the flat yarn, then in the regions of such twist the width of the yarn is narrowed and the yarn becomes thicker, so irregularities are produced in the surface of the preform produced by the FW method. Hence, in the case where the preform is molded into a FRP racket frame, a stress concentration occurs in such twist regions when subject to the action of external pressure, and the mechanical properties become non-uniform.

Even where the weight per length of the flat yarn is raised and the fibre density increased, in a preform produced by the winding of such flat-form substantially twist-free flat yarn crimp can be kept to an extremely low level at the regions of cross-over of the flat yarn when wound by the FW method and so that good mechanical properties are obtained when the FRP is produced. Again, where the weight per length of a flat yarn has been raised, the flat yarn and, consequently, the preform and FRP racket frame based thereon, can be produced more cheaply.

Moreover, with a flat yarn, at the time of FW it is possible to increase the winding pitch at the same weight per length, so the number of windings can be correspondingly reduced and the preform can be produced very efficiently. Furthermore, since crimps can be kept to an extremely low level when producing the preform by the FW method as stated above, it is possible to increase yarn weight per length. Consequently, when molded into a FRP racket frame, as well as being able to set a high fibre content, resin-rich regions can be kept down to extremely low levels and a lightweight FRP racket frame is obtained which has high strength and uniform mechanical properties.

Moreover, since a reinforcing fibre multifilament yarn maintained in a flat state is used, resin impregnation is extremely good. Consequently, a composite material with still more uniform characteristics is obtained and the target mechanical properties are readily obtained.

For this flat yarn, preferably the yarn width lies in the range from 4 to 30 mm and the yarn width/yarn thickness ratio is preferably at least 10. If the yarn width is less than 4 mm, the aforesaid beneficial effects of a flat form are reduced whereas if it exceeds 30 mm then handling becomes difficult. If the yarn width/yarn thickness ratio is less than 10 then it is difficult to keep the aforesaid crimps to low levels. Where the yarn width lies in the range about 4 to 16 mm the handling is easy, and so this is a preferred embodiment.

As an example of a method for producing such flat yarn, in the manufacturing process of the reinforcing fibre yarn a fibre bundle comprising a plurality of reinforcing fibers may be spread-out to a prescribed width with a roll, etc, to produce a flat shape, and this shape then maintained as it is by means of a sizing agent or the like. In particular, it will be preferable to have applied a small amount of sizing agent, of no more than 2 wt %, in order that the flat shape be excellently maintained.

Using the aforesaid flat yarn comprising reinforcing fibre multifilament yarn, a preform is produced as shown in FIG. 2 for example, and then using this preform a FRP racket frame is molded as shown in FIG. 5, for example.

FIG. 3 is an example where a circumferentially wound layer is arranged in the region corresponding to the top portion of the racket frame. Firstly, as shown in FIG. 3(A), on the tubular core material 2 which covers the mandrel 1 there is a layer formed by the helical winding of reinforcing fibre 3 by the FW method. In this helically wound layer 5, the winding begins with the winding angle first at 45° in the preform axial direction (the mandrel 1 or core material 2 axial direction) and then just before the region corresponding to the top portion of the frame the winding angle is altered from 45° to 10°. Next, winding is continued while maintaining this angle of 10° in the region corresponding to the top portion of the frame, but from the point when this region corresponding to the top portion ends the angle is again changed from 10° to 45°, and then winding performed up to the end of the core material while maintaining the angle at 45°, thus forming the reinforcing fibre helically wound layer 5.

Further, in this helically wound layer 5, the winding angle may also vary as in FIG. 1(B'), such that it is at its greatest at core material end portions, that is to say the position (a) end regions corresponding to the grip portion of the racket frame, and at its lowest in the core material centre portion, that is to say the position (b) central portion (around the centre line in the figure) corresponding to the frame top portion, being ±45° in the two end portions and ±10° in the centre portion.

As shown in FIG. 3(B), a circumferentially wound layer 8 is provided at position (a) corresponding to the top portion of the frame. As well as the case of a layer in which the winding angle is at right angles ±90°) to the axial direction, this circumferentially wound layer can also be taken to include the case in which the winding angle is at least ±75° C. and, in certain circumstances, where it is at least ±60°. In other words, it will be a layer such that, by means of the circumferential winding of reinforcing fiber, buckling can be suppressed in the top portion where there is considerable arranged fiber of low winding angle, and the impact strength enhanced.

Furthermore, as shown in FIG. 3 (C) there is provided a helically wound layer 5 of reinforcing fiber. In this particular aspect, this helically wound layer is also formed at the same winding angle as in aforesaid (A). By employing this kind of variable winding, it is possible to reduce weight caused by the circumferential winding in comparison with FIG. 1, and the overall weight and balance can readily be controlled.

The winding angle of the reinforcing fibre in the aforesaid helically wound layers 5,5 is not restricted to the aforesaid values and, for example, in the regions corresponding to the grip portion the angle may lie in the range from ±20° to ±60°, while in the position corresponding to top portion of the frame it may lie in the range from ±1° to ±45°.

Further, in this embodiment, the winding angles of the reinforcing fibre in both helically wound layers 5,5 have been made to vary, but for further stabilization of the configuration it is preferred that the number of wound layers be controlled with the winding angle in the outermost layer being substantially constant.

Now, as shown in for example FIG. 4(A), (B) and (C), in a conventional FRP racket frame product where helically wound layers of reinforcing fibre are provided, the winding angle along the axial direction of the superimposed helically wound layers 101 (e.g. ±30°), 102 (e.g. ±10°) and 103 (e.g. ±30°), is substantially constant in each case.

The FRP racket frame is molded for example as shown in FIG. 5 using the preform 7 produced as described above.

The resin-free dry preform 7 shown in FIG. 1 is shaped roughly to the shape of a racket frame like preform 11 in FIG. 5, and the preform 11 is then set inside the cavity of mold 12 used for molding.

Next, a resin composition produced by mixing the main ingredient 13 and curing agent 14 in prescribed proportions is introduced into the mold. As well as heating the mold 12, pressure is applied within the tube 2 of the preform, and the resin is cured and the FRP racket frame obtained. Furthermore, the dry preform may also be introduced into a mold already heated to the curing temperature of the resin.

Now, in the aforesaid example, there has been described the method of molding the FRP racket frame by the RTM method, but it may also be molded by other methods. For example, in the production of the preform there may be used reinforcing fiber comprising a fibre bundle already impregnated with the matrix resin, the preform then being produced by winding this by a winding method of the kind shown in FIG. 1, after which the preform is shaped in the form of a racket and set in the mold, and heating and curing of the resin effected.

Again, the dry preform employed in the aforesaid RTM method may be directly impregnated with resin, following which it is shaped in the form of a racket and set inside a mold as shown in FIG. 6, and heating and curing of the resin effected.

Furthermore, at the time of the preform production by the FW method, there may be used as the core material a material which can form the racket core, and then the preform produced set inside the mold along with the core and molding performed.

Moreover, there are no particular restrictions as to the type of reinforcing fibre in the present invention and, for example, as well as glass fibre or carbon fibre there can also be used organic high modulus fibers such as polyaramid fibers, etc.

Again, there are no particular restrictions on the type of matrix resin, and there can be used thermosetting resins, thermoplastic resins or resin mixtures thereof. Generally speaking, thermosetting resins are most often used for FRP rackets and, of these, epoxy resins are most widely employed.

As epoxy resins, there can be used various types of epoxy resins such as, for example, bisphenol A type epoxy resins, phenol novolak type epoxy resins, cresol novolak type epoxy resins, glycidylamine type epoxy resins, alicyclic epoxy resins, urethane modified epoxy resins and bromo-bisphenol A type epoxy resins, etc. These epoxy resins can be used singly or two or more types can be jointly employed. While there are no particular restrictions on the curing agent, from the point of view of storage properties a latent curing agent is preferred. As examples of latent curing agents, dicyandiamide and other such guanidine type materials are ideally employed.

In a FRP racket frame composed as described above, since there is a reinforcing fiber layer in which the winding angle of the reinforcing fibre is varied, it is possible to freely vary the mechanical properties in the frame axial direction in accordance with the properties demanded.

Again, the weight and balance between the grip side and the top side, that is to say the position at which the centre of gravity lies between the grip end and the top, is a vital characteristic in terms of sports performance. Hitherto, the adjustment thereof has been carried out by attaching lead or the like, but in a FRP racket frame as described above the weight and balance (the position of the centre of gravity) can be freely designed without attaching lead, etc, by the setting of the winding angles in helically wound layer 5, that is to say, by how the winding angle is altered. Moreover, fine adjustment thereof is also possible. Consequently, the weight and balance can be freely adjusted without an accompanying increase in weight.

Furthermore, the aforesaid varying of the winding angle is performed merely by pre-setting the winding machine so that the winding angle is altered in the FW method, so this can readily be carried out without the need for the addition of new equipment or new procedures.

EXAMPLES

Example 1

Using a preform having wound layers of reinforcing fibre as shown in FIG. 1, a FRP racket frame was molded by the method shown in FIG. 5.

In regard to the preform, a steel core material of external diameter 15 mm which was covered with a nylon tube of folded diameter 24 mm was set in a FW machine (made by Asahi Engineering (Co.), FWM2400-LSW) in which had been programmed the winding angle at each position in the axial direction, and then a dry preform was produced by the three-layer winding thereon, in the construction shown in FIG. 1, of carbon fibre (carbon fibre made by Toray Industries (Inc.), "Torayca" T700SC-12K [single fibre diameter= $7\mu$, number of filaments=12,000, yarn weight per length= 800 tex, density=1.8 g/cm3]) which was drawn off from a creel (creel tension 400 g), after which this dry preform was removed from the core material by hand along with the tube. The removal from the core material did not require an especially large force and was very easy and, moreover, there was no disruption of the yarn.

The preform obtained was shaped in the form of a racket frame, then a separately-prepared yoke fitted, after which it was inserted within the mold cavity and the mold closed. As well as raising the temperature of the mold in advance to the molding temperature of 120° C., 1 MPa compressed air was introduced and the interior of the nylon tube pressurized. Further, the mold pressure was reduced to −87 KPa gauge pressure via the mold suction hole. After the raising of the temperature was complete, preheated resin and curing agent were mixed together in a two-liquid mixing piston-type injector, and the mixture injected via the mold resin injection orifice. The resin and curing agent used were Epoxy Resin Ep827 and Ep113 made by Shell, and these were mixed in the proportions of 100:25. 30 minutes after injection of the resin, the mold was opened, the product removed from the mold and a molded racket frame body obtained.

The molded racket frame body obtained was excellent and essentially free of surface defects such as voids, etc.

When the weight and balance following the cutting of the racket frame obtained to a fixed length was investigated based on the distance of the position of the centre of gravity from the grip, this was 34 cm, and the target position had been achieved with good accuracy.

Comparative Example 1

A FRP racket frame of the same weight as that in Example 1 was molded by an absolutely identical method to that in Example 1 excepting that there was used a preform having reinforcing fibre wound layers as shown in FIG. 4. The position of the centre of gravity of the racket frame obtained was 36 cm from the grip portion, which was away from the target position. In order to correct this to the target position, a weight was attached to the grip portion, and so this led to an increase in the weight of the racket frame as a whole.

Example 2

A racket frame was molded by an absolutely identical method to that in Example 1 excepting that the Toray Industries (Inc.) carbon fibre "Torayca" T700SC-12K, which was the reinforcing fibre used, had a flat shape maintained by the application of 1 wt % sizing agent such that the yarn width was 5 mm, the yarn thickness was 0.1 mm, and the yarn width/thickness ratio was 50.

When the flexural stiffness EI (E: elastic modulus of the frame structural material, I: geometrical moment of inertia of the frame) was calculated by binding the grip portion of the frame obtained, then supporting a weight at the top portion and measuring the displacement of the top portion, it was 8.03×108N.mm2. For simplicity, for the geometrical moment of inertia I there was assumed a cross-sectional shape comprising a combination of two ellipses of major axis 22 mm and minor axis 11 mm.

When, as a comparison, measurement/calculation of the flexural stiffness of the frame obtained in Example 1 was performed, this was 7.22×108N.mm2, and so an enhancement in properties due to the use of the flat strand was confirmed.

Example 3

A racket frame was molded by an absolutely identical method to that in Example 1 excepting that the winding angle in the helical layers was varied from ±45 to 10° as in FIG. 3, and there was provided a circumferentially wound layer in the frame top region using the same reinforcing fiber. The frame obtained had the same product weight and balance as in Example 1.

After stretching the gut while applying a tension of 25 kg to the racket frame obtained, a support of weight 525 g was fitted and then the racket dropped freely from arbitrarily fixed height onto its top, and a check made as to whether or not there was damage. As a result, even when the dropping height was raised to 3.0 m, still no observable damage was noted.

For comparison, when the frame obtained in Example 1 was subjected to the same kind of dropping test, damage was produced in the top portion at a dropping height of 2.4 m. Thus, the enhancement of the dropping impact strength by a circumferentially wound layer was confirmed.

INDUSTRIAL UTILIZATION POTENTIAL

With the FRP racket frame of the present invention, the required properties at each position can be freely designed while still maintaining the racket frame weight and balance, so it is ideal for wide use for all kinds of rackets. Again, since it is possible to produce a racket frame with the aforesaid outstanding qualities and properties cheaply and stably, the method of the present invention for manufacturing racket frames is ideal for application to the manufacture of FRP racket frames.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A racket comprising:

a curved top portion forming a string face;

a longitudinal grip portion;

a longitudinal throat portion connecting said top portion and said grip portion, each portion including a frame made of fiber reinforced plastic containing resin and reinforcing fiber, said frame includes at least one helically wound layer of continuous reinforcing yarn, said at least one helically wound layer having a winding angle in each portion defined according to an axial direction of said frame, said top portion having a first winding angle, said throat portion having a second winding angle, said grip portion having a third winding angle, said second and said third winding angle being substantially greater than said first winding angle, whereby stiffness of said top portion is substantially increased to enhance repulsive forces generated in said top portion due to impacts.

2. The racket of claim 1, wherein each winding angle is within a range from +/−1° to 75°.

3. The racket of claims 1 or 2, wherein said first winding angle is within a range from +/−1° to 45°, while said second and said third winding angles are within a range from +/−20° to 60°.

4. The racket of claim 1, wherein said continuous reinforcing yarn includes a flat strand which has a width and a thickness, said width is substantially larger than said thickness.

5. The racket of claim 4, wherein said thickness lies within a range from 4 to 30 mm, and a ratio of yarn width/yarn thickness has a value of at least 10.

6. The racket of claim 1, further comprising a circumferentially wound layer of continuous reinforcing fibre in said top portion.

7. The racket of claim 1, wherein each winding angle continuously varies along a length of said racket.

8. The racket of claim 1, further comprising transient regions between each portion.

* * * * *